United States Patent [19]

Manheimer et al.

[11] Patent Number: 5,182,496
[45] Date of Patent: Jan. 26, 1993

[54] METHOD AND APPARATUS FOR FORMING AN AGILE PLASMA MIRROR EFFECTIVE AS A MICROWAVE REFLECTOR

[75] Inventors: Wallace M. Manheimer, Silver Spring, Md.; Anthony E. Robson, Alexandria, Va.; Robert A. Meger, Crofton, Md.

[73] Assignee: The United States of America as represented by the Secretary of the Navy, Washington, D.C.

[21] Appl. No.: 867,862

[22] Filed: Apr. 7, 1992

[51] Int. Cl.[5] .............................................. H05H 1/10
[52] U.S. Cl. ........................... 315/111.41; 315/111.21; 315/111.71; 313/231.31
[58] Field of Search ...................... 315/111.21, 111.41, 315/111.71, 111.81; 313/231.31; 250/423 R

[56] References Cited

U.S. PATENT DOCUMENTS

| | | |
|---|---|---|
| 3,405,301 | 10/1968 | Shigeru Hayakawa et al. ................................ 315/111.41 X |
| 4,507,588 | 3/1985 | Asmussen et al. ......... 315/111.41 X |
| 4,829,215 | 5/1989 | Kim et al. ...................... 315/111.41 |
| 4,950,956 | 8/1990 | Asmaki et al. ............. 315/111.41 X |
| 5,007,373 | 4/1991 | Legg et al. ................. 315/111.21 X |
| 5,075,594 | 12/1991 | Schumacher et al. ......... 315/111.21 |

OTHER PUBLICATIONS

W. M. Manheimer, "Plasma Reflector for Electronic Beam Steering in Radar Systems", IEEE Transactions on Plasma Science, vol. 19, (No. 6), p. 1228 (Dec. 1991).
W. M. Manheimer, "Plasma Reflector for Electronic Beam Steering in Radar Systems", NRL Memorandum Report 6809 (Apr. 17, 1991).

*Primary Examiner*—Eugene R. Laroche
*Assistant Examiner*—Do Hyun Yoo
*Attorney, Agent, or Firm*—Thomas E. McDonnell; Edward F. Miles

[57] ABSTRACT

A method and apparatus for forming plasma sheets of preselected planar curvature, which can be used as mirrors for X-Band microwaves and above. A plasma is created using a shaped cathode. Confining magnetic fields maintains the plasma in the shape of the cathode. Additional magnetic fields can provide additional curvature to the plasma sheet.

9 Claims, 9 Drawing Sheets

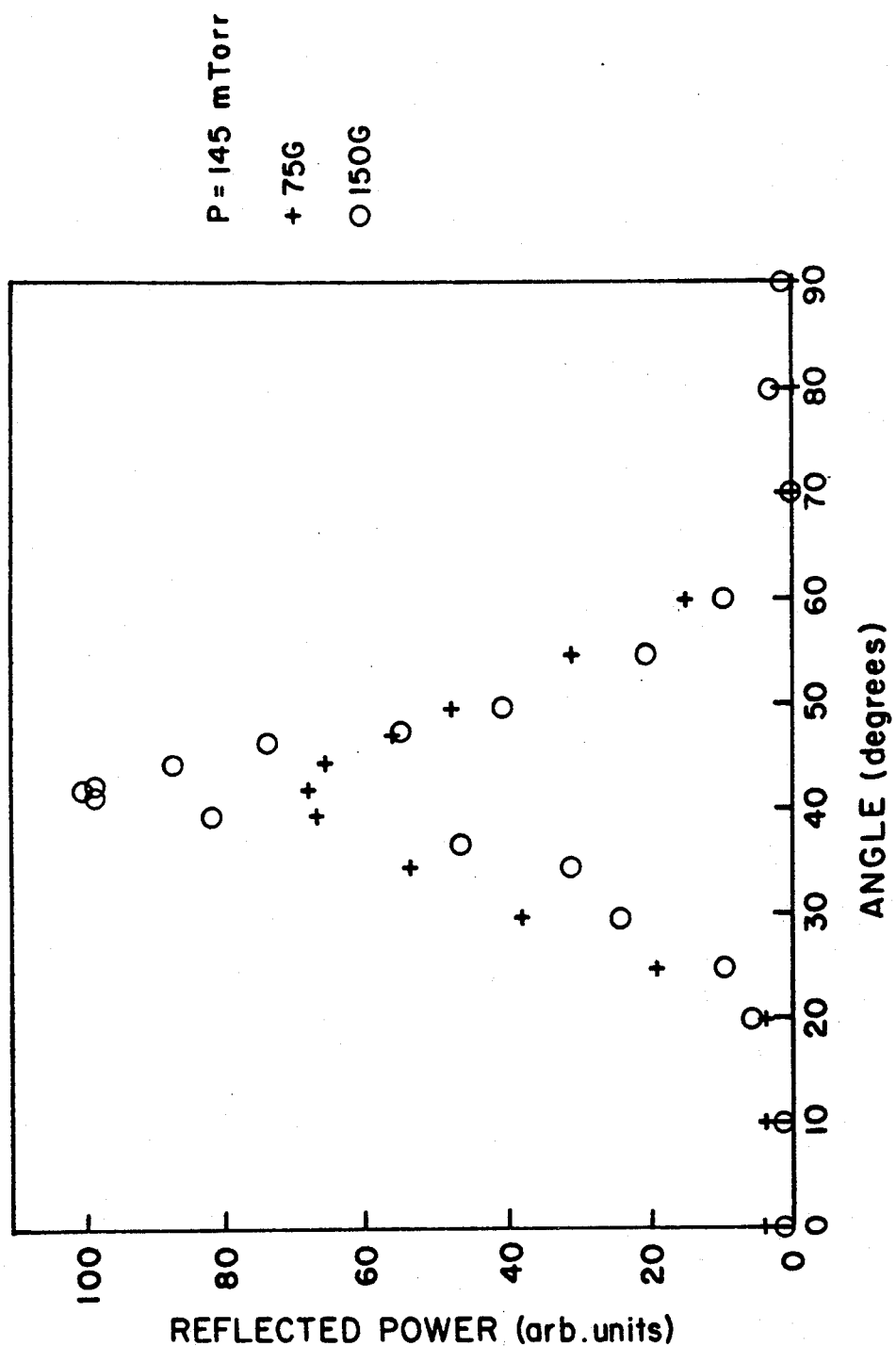

METHOD AND APPARATUS FOR FORMING AN AGILE PLASMA MIRROR EFFECTIVE AS A MICROWAVE REFLECTOR

BACKGROUND OF THE INVENTION

Many military radars, such as Aegis, use phased array antennas. The elements of phased arrays must be spaced apart a distance less than $\lambda/2$, where $\lambda$ is the highest frequency for which the antenna will be used. At higher frequencies, the spacing between elements becomes so small that the effective power of the radar becomes unacceptably small, and the cost to fabricate the array becomes prohibitively large. Also, the agility of such a phased array, i.e. the speed with which it can switch among its various "look angles," depends on the delay times needed to properly phase the array.

As is well known, a plasma reflects electromagnetic radiation whose frequency $\nu$ is less than the plasma frequency $\nu_p = 9(10)^3 n_e^{\frac{1}{2}}$, where $n_e$ is the plasma electron density in $cm^{-3}$ and $\nu_p$ is in Hz. It has been suggested that this property could be exploited to make plasma mirrors which could take the place of the usual metallic reflectors in some radar systems. See W. M. Manheimer, "Plasma Reflectors for Electronic Beam Steering in Radar Systems," IEEE Trans. Plasma Sci., vol. PS19, p. 1228 (1991); see also, NRL Memorandum Report 6809 (Washington, D.C., Naval Research Laboratory, April, 1991) a document of the same author and title. Such plasma mirrors would be virtually inertialess and would allow the radar to be redirected on a timescale determined by the time that it takes for a suitable plasma to be created and to decay. This could lead to radar systems having the directional agility of phased arrays, but with greatly reduced complexity and cost. Furthermore, the plasma mirror could be used at higher frequencies than those currently considered practicable for phased arrays.

SUMMARY OF THE INVENTION

The invention derives from several insights: To reflect microwaves at a nominal X-Band frequency, or above, for example 15 GHz ($K_u$-Band), electron density $n_e$ must exceed about $2.8(10)^{12}$ electrons per $cm^{-3}$. In addition, in order that the plasma should not absorb an appreciable fraction of the incident radiation, it is necessary that the greater of $\nu_{en}$ and $\nu_{ei}$ be much less than $\omega$ ($\omega = 2\pi \nu$), where $\nu_{ei}$ is the electron-ion collision frequency and $\nu_{en}$ is the collision frequency between electrons in the plasma and neutral atoms or molecules in the gas supporting the plasma. See, e.g., M. A. Heald and C. B. Wharton, Plasma Diagnostics with Microwaves (New York, John Wiley and Sons, 1965), chapter 2. If the electron temperature $T_e \approx 1$ eV, and the plasma is singly-ionized, $\nu_{ei} \approx 10^7$ Hz, and so electron-ion collisions are negligible. For most common molecular gases $\nu_{en} \approx 10^{-7} n_0$, where $n_0$ is neutral density, so $\nu_{en} \approx < 0.01\omega$ if $n_0 < 9(10)^{15}$ molecules per $cm^3$, equivalent to a pressure of about 250 mTorr. From these numbers it appears that the basic requirements for a plasma mirror effective at x-Band and above can be satisfied by a rather modest, partially-ionized, plasma such as is found in the positive column of a pulsed low-pressure gas discharge.

Accordingly, an object of the invention is to permit selective directing of electromagnetic radiation at high frequency, at usefully high power levels.

Another object is to permit the formation of a planar plasma.

Another object is to permit repeatable formation of such a plasma.

Another object is to repeatably form such a plasma a various selected orientations in order to redirect microwave radiation in different directions at different times.

Another object is to permit formation and repositioning of such a plasma at time scales at, or faster than, those attained by current phased array antennas.

Another object is to permit formation of such a plasma mirror effective to direct high frequency electromagnetic radiation.

In accordance with these, and other objects made apparent hereinafter, the invention concerns an apparatus and method for forming a planar sheet of plasma which is effective to reflect electromagnetic radiation. The invention employs a gas, and a cathode exposed to the gas, and applies a magnetic confinement field to the gas. The cathode extends along an elongate distance having a preselected curvature transverse to the field. A trigger is then used to form a plasma in the gas, which results in a sheet of plasma with a cross-section having a curvature, in a plane transverse to the field, of substantially the said curvature as the preselected curvature. The magnetic field confines the plasma electrons, and prevents them from dispersing transversely to the field. The result is a sheet of plasma extending along the field, and having a cross-section in the shape of the cathode. Selection of the curvature of the cathode in the plane transverse to the field effectively sets the curvature of the sheet, and hence the reflection pattern of electromagnetic radiation incident on the sheet.

The invention is further illustrated by the following detailed description of particular embodiments. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

BRIEF DESCRIPTION OF THE DRAWINGS

FIG. 2b is a sectional view in the direction of lines 2b—2b of FIG. 2a.

FIGS. 3-7 concern an experiment done on an apparatus of the kind shown in FIG. 1-2. In particular:

FIG. 3 is a diagram of a discharge circuit for creating a plasma in the apparatus of FIG. 1.

FIG. 4 is a schematic diagram of the arrangement of microwave feed and detection horns used to do the experiment.

FIGS. 5a and 5b are to the same time scale, and are time aligned.

FIGS. 6a, 6b, and 6c are graphs of reflected microwave power detected by a fixed receiving horn versus mirror angle relative to a sending horn for two magnetic field strengths and three gas pressures.

FIG. 7 is a graph comparing microwave power reflected by a plasma mirror and a metal mirror, as a function of angle.

DETAILED DESCRIPTION

Figure 1:
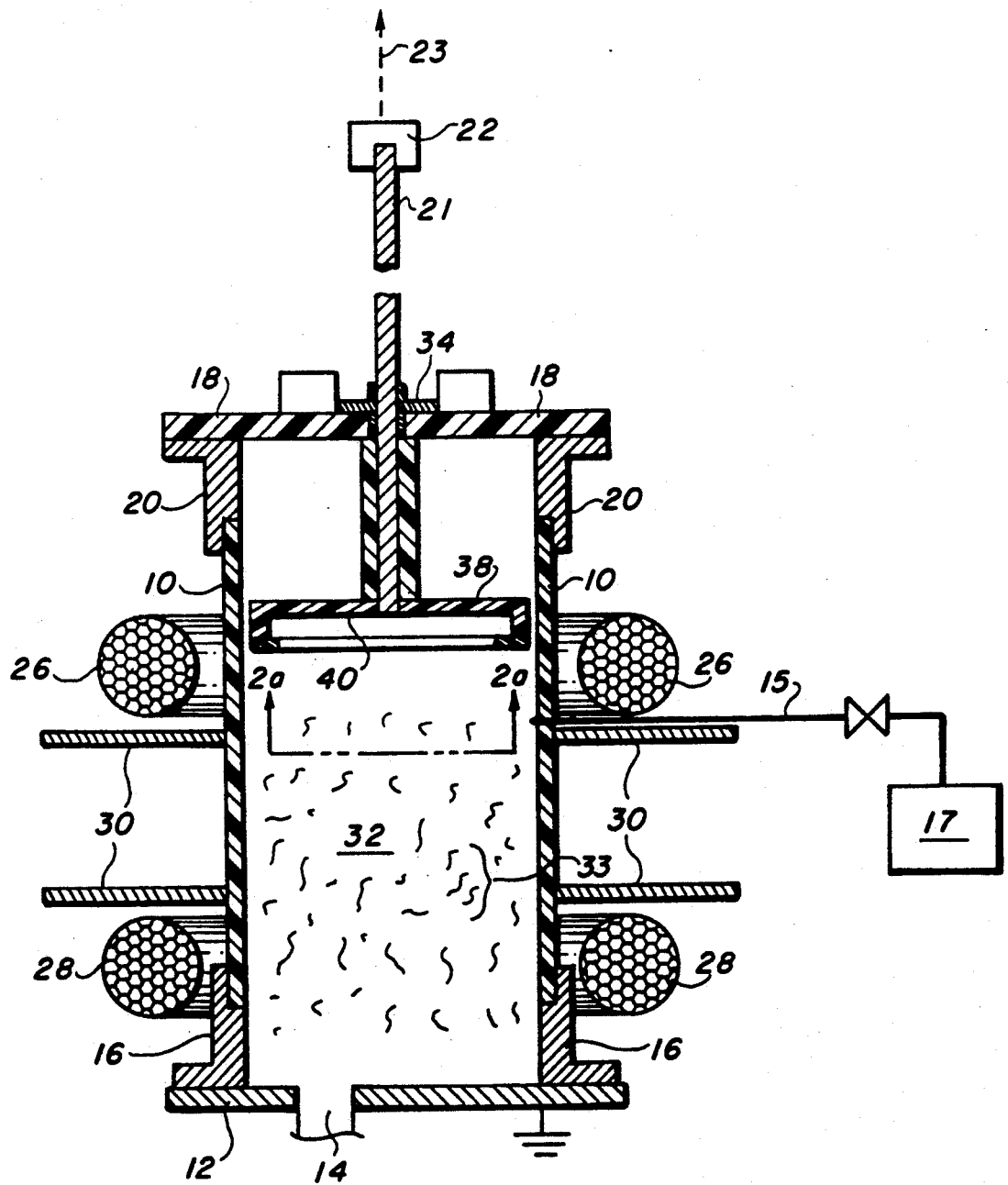
FIG. 1 is a side sectional view of an apparatus according to the invention.

With reference to the drawing figures, wherein like numbers indicate like parts throughout the several views, FIG. 1 and 2 show an apparatus according to the invention. The apparatus has a tube 10 disposed circumferentially about a direction 23. Tube 10 is sealed at its ends by endplates 12 and 18 connected to tube 10 by o-rings mounted on flanges 16 and 20, to form an airtight chamber 32. Endplate 12 has a gas line for charging and discharging tube 10 with an ionizable gas 33, and a sealable opening 14 to permit a vacuum pump to evacuate chamber 32. Penetrating tube 10 is a tube and needle valve line 15, connected to a gas source 17, for continuously regulating pressure within chamber 32. Penetrating endplate 18 is tube 21 disposed within airtight rotary seal 34. At one end of rod 21 is an apparatus, such as a servo motor 22, to rotate rod 21 about direction 23. Fixed to rod 21 at its other end for rotation with rod 21 is a disc 38 disposed in a plane orthogonal to direction 23. Recessed within depression 46 of disc 38 is an electric cathode 40. Disc 38 is preferably formed from two thinner discs 42 and 44, the larger of the two (44) containing depression 46, and the thinner of the two (42) having an opening of width 48 in registry with cathode 40 to ensure that only the inside surface of cathode 40 is exposed to gas 33 in chamber 32. Disposed circumferentially about direction 23 and chamber 32 is a pair of coils for generating a magnetic field within chamber 32 parallel to direction 23. Baffles 30 are made of electromagnetic absorbing material, such as the carbon-based absorber Eccosorb, and may be located about chamber 32 to spatially limit entry of radiation.

Figure 2A:
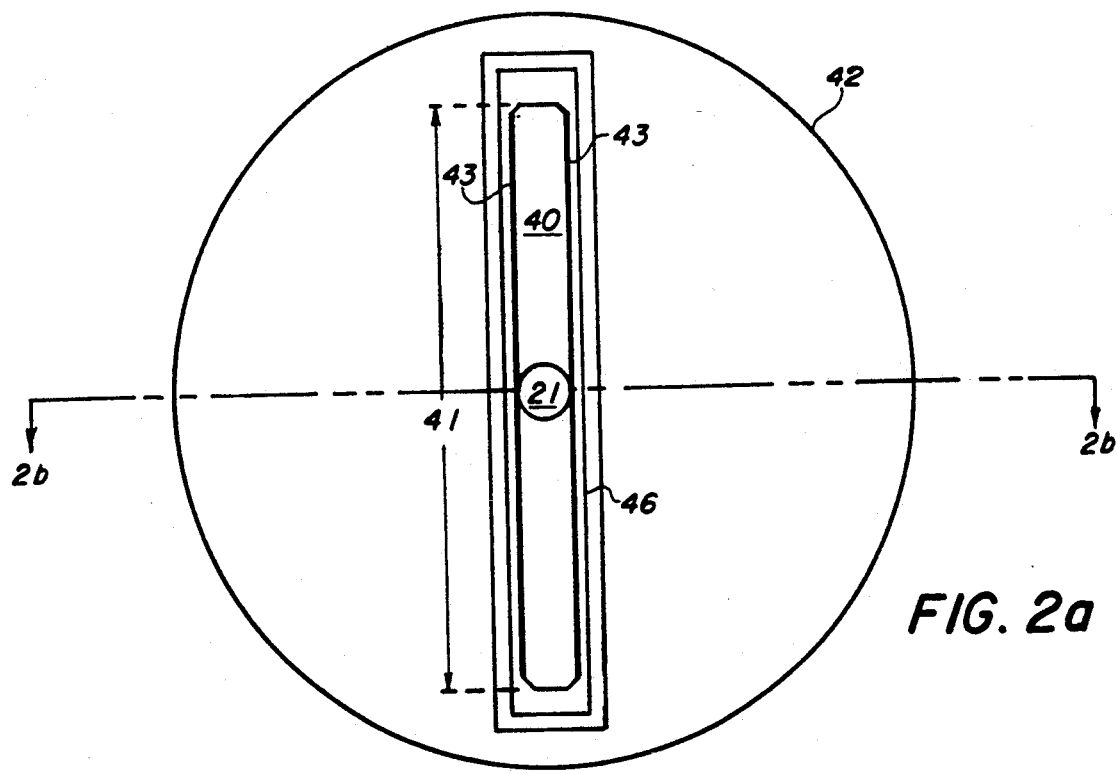
FIG. 2a is a view in the direction of lines 2a—2a of FIG. 1.
Figure 2B:
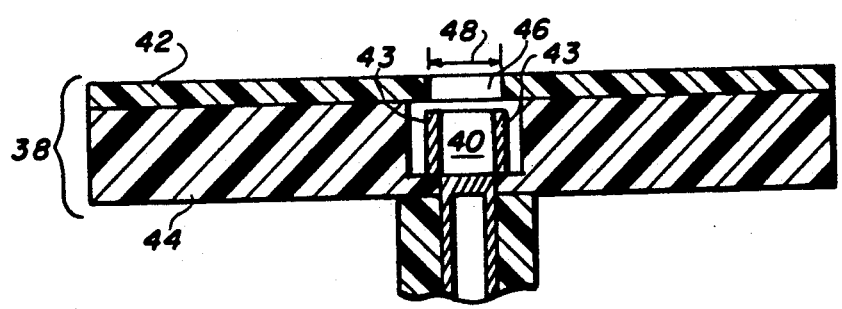

As seen in FIGS. 2a and 2b, cathode 40 extends linearly along an elongate path in a direction 41 perpendicular to direction 23, and of u-shaped cross-section in the direction of lines 2b–2b of FIG. 2a. This causes cathode 40 to be in the form of a straight line through the center of disc 38, whose outer boundaries are set by the relatively sharp ridges 43 of the cathode 40 extending perpendicular to disc 38. This, in conjunction with narrowed opening 48 in disc 42, ensures that electrons emitted by cathode 40 will enter chamber 32 through a spatially limited slit of a length the size of distance 41, and a width the size of distance 48.

In operation, the endplate 12 becomes the grounded anode so that it and cathode 40 constitute a cathode-anode pair. In this embodiment a plasma distribution is set up in chamber 32 by means of a glow discharge between cathode and anode. This plasma will have the shape of the cathode (width 48 and length 41), and, because of the magnetic field generated by coils 26 and 28, the plasma will form a sheet extending along chamber 32 between cathode 40 and anode 12. The result is a plasma in the form of a flat plate, which will be effective to reflect electromagnetic radiation propagating transverse to direction 23 (i.e. crossing into chamber 32 through tube 10). After the plasma discharges, servo motor 22 can rotate disc 38 and cathode 40 about direction 23, and the plasma can be reformed in the same shape, but correspondingly rotated Cathode 40 and anode-endplate 12 can be of any suitable metal, such as brass. Endplate 18 can be of any convenient insulating material useful at chamber pressures of interest, and able to withstand the voltage imposed between the cathode and anode without conducting, for example plexiglass. (Plexiglass has the added advantage of being inexpensive and easily machined.) Tube 10 and disc 38 must be electromagnetically non-conducting and non-ferromagnetic, in order not to affect the magnetic field set up by coils 26 and 28. Tube 10 must also allow transmission of microwave signals into chamber 32. Tube 10 and disc 38 can also be of plexiglass. O-rings and flanges 20 and 16 can be of any conventional and known kind. Rod 21 is preferably metallic, and of one piece with cathode 40, to remove the need for an additional electrical wire extending through rod 21 and rotary seal 34 to bias cathode 40. Gas 33 must be readily ionizable, and recombine quickly to permit rapid reforming of the plasma. Any gas with a large plasma recombination or attachment coefficient will do, such as molecular gases, air, or a noble gas with $SF_6$ or other gas having a large electron affinity added as an electron attacher.

The magnetic field of coils 26, 28 confines the plasma along direction 23. This ensures that the plasma electrons, having been emitted along the elongate length of cathode 40, maintain substantially the same cross section as the plasma electrons travel to anode 12. Thus the plasma forms into a thin sheet whose cross-section corresponds the cross-section of the cathode. Confinement in the transverse direction to this field requires that $\omega_{ce}\tau >> 1$ and $\rho_e << d$, where $\omega = 1.76(10)^7 B =$ the electron gyrofrequency (in sec$^{-1}$) in the magnetic field B (in G), $\tau$ is collision time of the electrons with gas neutrals (in seconds), $\rho_e = 2.38 T_e^{\frac{1}{2}}/B =$ is the electron gyroradius in the magnetic field (in cm), d is the thickness of the plasma sheet in the direction 48 (in cm), and $T_e$ is the temperature of the electrons (in eV). At a gas pressure of 150 mtorr and d=1 cm, a field of B=150 G is sufficient to make $\omega_{ce}\tau = 5$, and d=0.02. Creation of the cathode plasma by glow discharge, which produces a uniform sheet of plasma, is preferred rather than an arc discharge, which results in concentration of the plasma current into a spot on the cathode and, consequently, produces a non-uniform plasma sheet.

Although cathode 40, and hence the plasma sheet it produces, has linear curvature in this embodiment, this is only exemplary. Cathode 40 could have other curvatures about direction 23 to produce plasma sheets with other shapes, e.g. elliptical or parabolic. Additionally, one could provide additional magnetic coils to produce fields transverse to direction 23 in order to further selectively control the plasma sheet's curvature. This would allow full three dimensional control of the orientation of the plasma sheet.

Cathode 40 could also be in different forms to add flexibility to the system, for example be a two-dimensional array of programmable field emitters. By selectively firing selected emitters, one could select the curvature of the cathode, and thus arbitrarily select the plasma mirror's cross-section. One could also provide such an array in two or three transverse dimensions with the complementary magnetic field coils to permit forming a plasma sheet in virtually any spatial orientation, with virtually any cross-sectional curvature.

PROOF OF PRINCIPLE EXPERIMENT

An experiment was done with an apparatus as shown in FIGS. 1–2, using the materials set forth in the preceding paragraphs. (In place of servo motor 22 was a hand crank.) The experiment proceeded as follows:

A. Experimental set Up

Tube 10 was a 40 cm long cylinder of 9.5 cm inner radius.

Endplate-anode 12, and o-ring flanges 16, 20, were of aluminum.

Coils 26, 28, were 152 turns of number 10 insulated wire. Each coil had a mean radius of 15.4 cm. The coils' centers were separated from one another by about 19 cm, making coils 26, 28 virtually a Hemholtz pair. The resultant magnetic flux density they produce was calculated as 7.5 G/A near the center of chamber 32.

Gas 33 used in this test was air, at a pressure between about 100 and 400 mTorr.

Microwave radiation from horn 54 was at 15 GHz.

Figure 4:
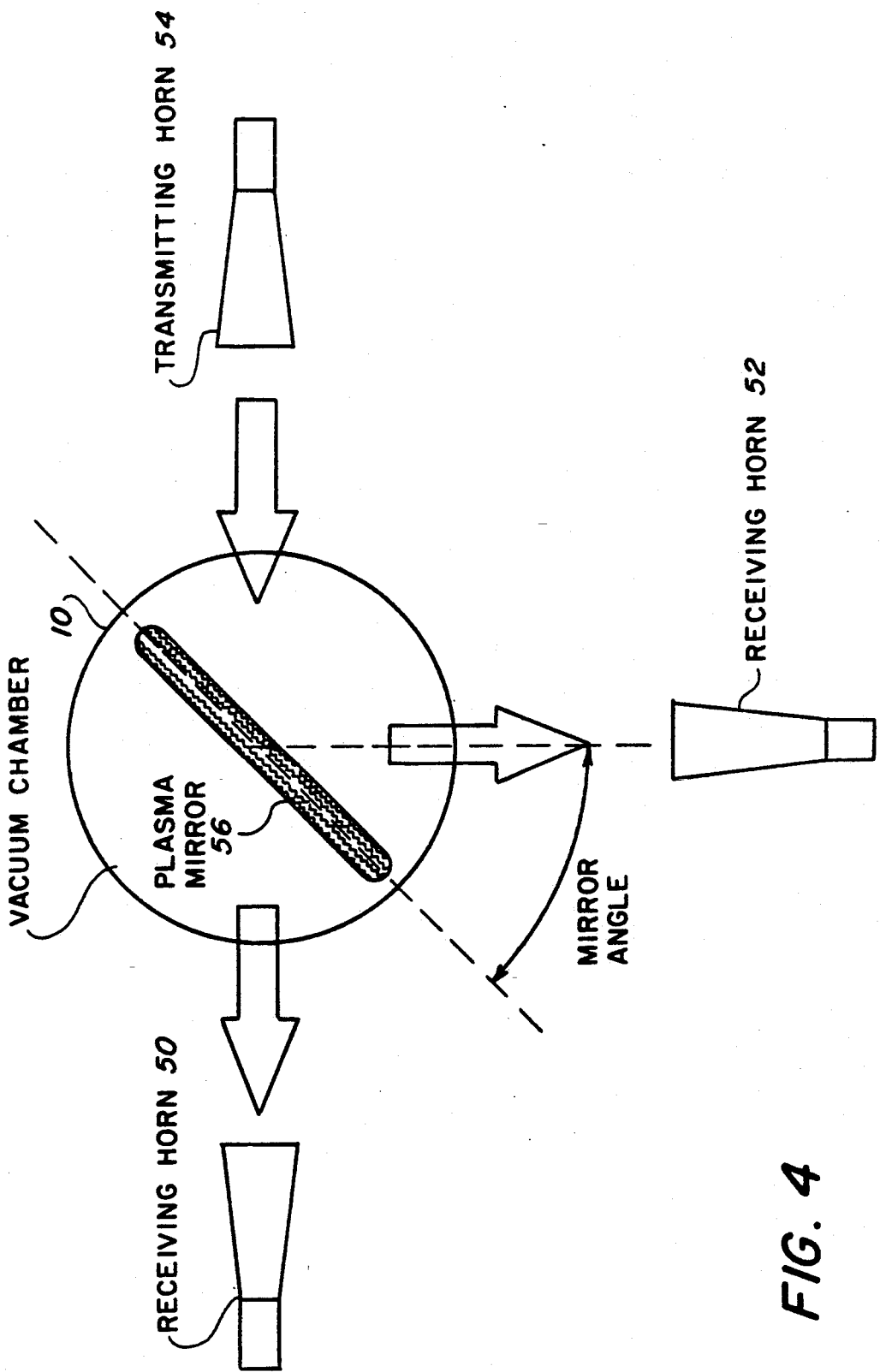

Three microwave horns were used as radiators and detectors, as shown by members 50, 52, 54 of FIG. 4 (which shows the horns' orientation with respect to plasma mirror 56).

Magnetic flux density B (referred to herein interchangeably with magnetic field strength) was between 75 and 200 G.

Figure 3:
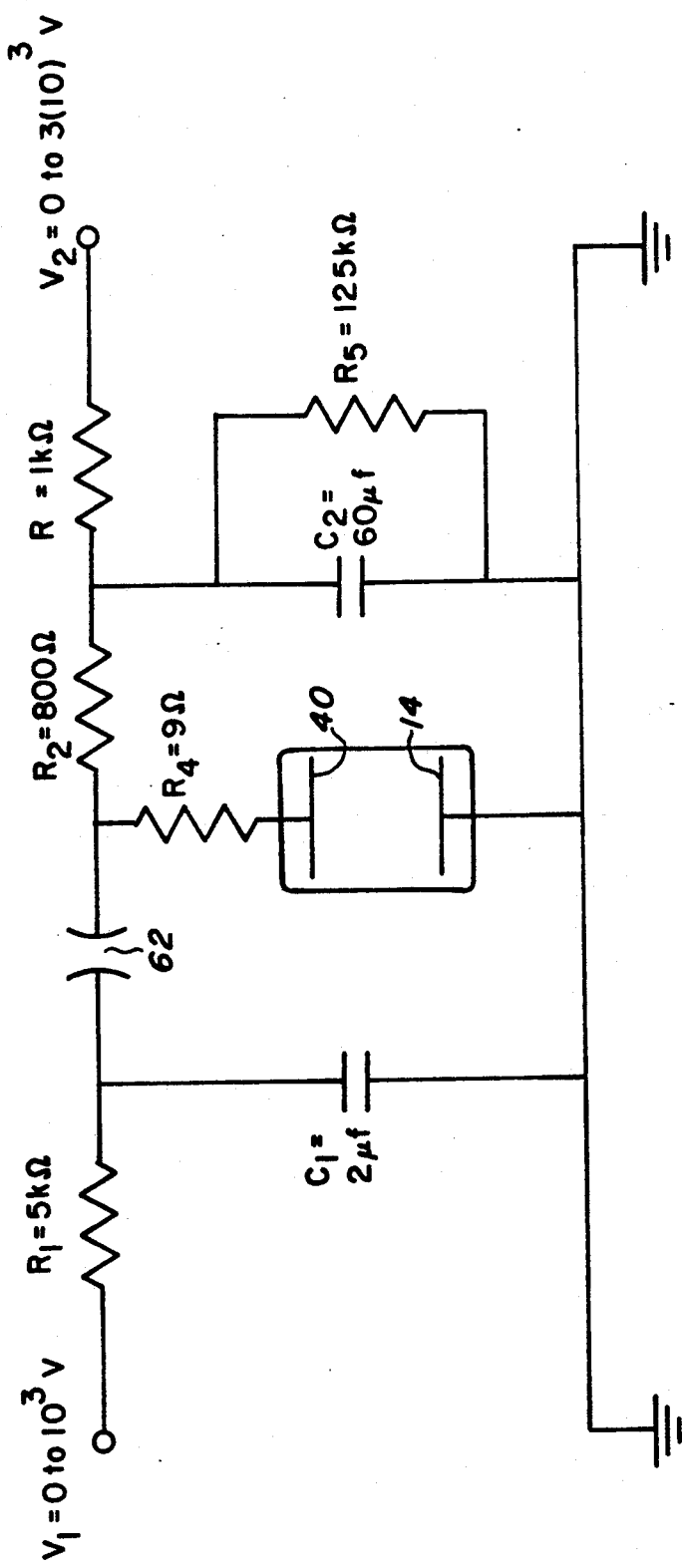

An initial low density plasma distribution was set up by a constant glow current of between 0 and 100 mA between the cathode and anode. Another voltage pulse of between 1 and 2.5 kV was imposed by firing switch 62 (FIG. 3). This resulted in a pulse current as low as 1 A, and as high as 100 A when arcing occurred significantly.

FIG. 3 is the circuit that was used to trigger formation of plasmas in chamber 32. Electrodes 40 and 12 are, as discussed previously, inside chamber 32 in contact with gas 33. Resistors $R_2$, $R_3$, $R_4$ permit constant delivery of current to electrodes 40 and 12 to support the glow discharge in gas 33. Resistor $R_1$ allows charging of capacitor $C_1$. When switch 62 is fired with a separate trigger (not shown) it discharges through resistor $R_4$ and the plasma distribution. The voltage on capacitor $C_1$ is what drives the current through the plasma to produce the plasma mirror. Capacitor $C_2$ and resistor $R_5$ protect the glow discharge power supply from the pulsed capacitor $C_1$.

B. Plan of the Experiment

The experiments were conducted in two stages. The first stage consisted of a systematic exploration of parameter space to establish conditions under which the microwave transmission was cut off, indicating that the critical plasma density had been achieved or exceeded. The second stage consisted of more refined experiments to study the characteristics of the reflected beam and to make an initial assessment of its quality by comparing reflection from the plasma with reflection from a metal plate.

C. Experimental Results

1. Cutoff Experiments

For these experiments the plasma sheet was oriented perpendicular to the microwave beam. The low-current (0–100 mA current) glow discharge alone produced a well-defined plane sheet of plasma but the density was not sufficient to cut off the microwaves. Discharge of the capacitor into the plasma distribution produced by the glow discharge gave a pulse of current whose shape could be approximated as $I = I_0 \sin^2(\pi t/T)$ with $I_e$ equal to several amps and $T \approx 60$ μs. During the pulse the capacitor voltage fell by only about 15%, and the decay of the current appeared to be due to an increase in the impedance of the discharge, a phenomenon that we did not investigate further. The plasma sheet became much brighter and appeared to the naked eye and open shutter photography to be uniform. As the voltage on the pulsed capacitor was increased in 50 V increments starting from 1 kV, we observed first partial and then full cutoff of the microwave beam during the interval when several amperes were passed through the discharge. Further increase of the voltage led to arcing, with currents of >100 A flowing in a visibly constricted plasma channel; this either did or did not result in cutoff according to where the channel occurred in relation to the microwave beam. The principal experimental problem was to find conditions in which an adequate plasma density could be produced without arcing. A survey of parameter space led to the following observations:

a. To achieve cutoff required a minimum pulsed current, which increased with increasing pressure but was independent of the magnetic field. At 145 mTorr the current was 5 A, at 245 mTorr it was 10 A. The capacitor voltage required at the higher pressure was slightly lower, 1.6 kV versus 1.65 kV, with B=75 G. When the magnetic field was increased to 150 G it was necessary to increase the voltage to 1.9 kV at 145 mTorr and 1.8 kV at 245 mTorr. Raising the voltage above 2 kV resulted in sporadic breakdown into the arc mode, the probability of which increased with increasing voltage. At pressures below 100 mTorr it was not possible to produce cutoff without inducing arcing. Pressures above 300 mTorr were not considered interesting because at these pressures absorption of the microwaves due to electron-neutral collisions will no longer be negligible.

b. When raising the voltage in steps from a low value the progress from partial to full cutoff was very reproducible; the threshold for arcing, however, was not reproducible and tended to increase with time as a result of conditioning. If the system was let up to air, a conditioning period was necessary to restore the non-arcing mode of operation.

c. Although the pulsed discharge could be obtained in the absence of the d.c. glow, it was more prone to arcing. Large glow currents (30–100 mA), on the other hand, resulted in lower pulse currents and made it harder to obtain cutoff. A current of 10 mA was deemed to be satisfactory and was used in almost all the experiments reported here.

The principal conclusion from this part of the work was that it is possible to obtain reproducible plasma conditions that gave microwave cutoff, over a narrow range of pressure and capacitor voltage. This limitation is probably inherent in this particular method of plasma production. The pressure and voltage range will depend on the gas used, in a manner known to those skilled in this field. Once a suitable operating regime was established, however, with the exception of electrode conditioning effects, the formation of the plasma was highly reproducible shot to shot.

2. Reflection Experiments

Having established conditions for cutoff, simultaneous measurements of microwave transmission and reflection were made using the arrangement shown in FIG. 4. As was to be expected, the conditions for good reflection were more restricted than for cutoff; cutoff requires only that the plasma should be overdense but reflection requires that, in addition, it should be uniform, plane and non-absorbing. One might therefore expect that the reflection would be improved as the pressure was lowered and the magnetic field was increased. This was borne out by the experimental results. A case close to the optimum is illustrated in FIG. 5, which shows the discharge current, I, and the transmitted and reflected signals on the same timescale (65 and 67 respectively). Complete cutoff is observed when I>2 A and the flat top of the reflected signal corresponds to I>4 A. As mentioned above, the current pulse was determined by the time-varying impedance of the discharge, and the only circuit variable was the voltage $V_1$ on the capacitor $C_1$.

Figure 5A:
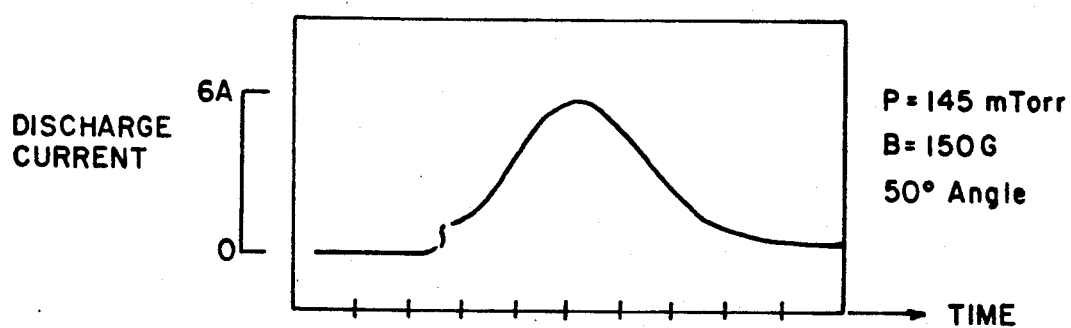
FIG. 5a is graph of a current pulse used to create a plasma.
Figure 5B:
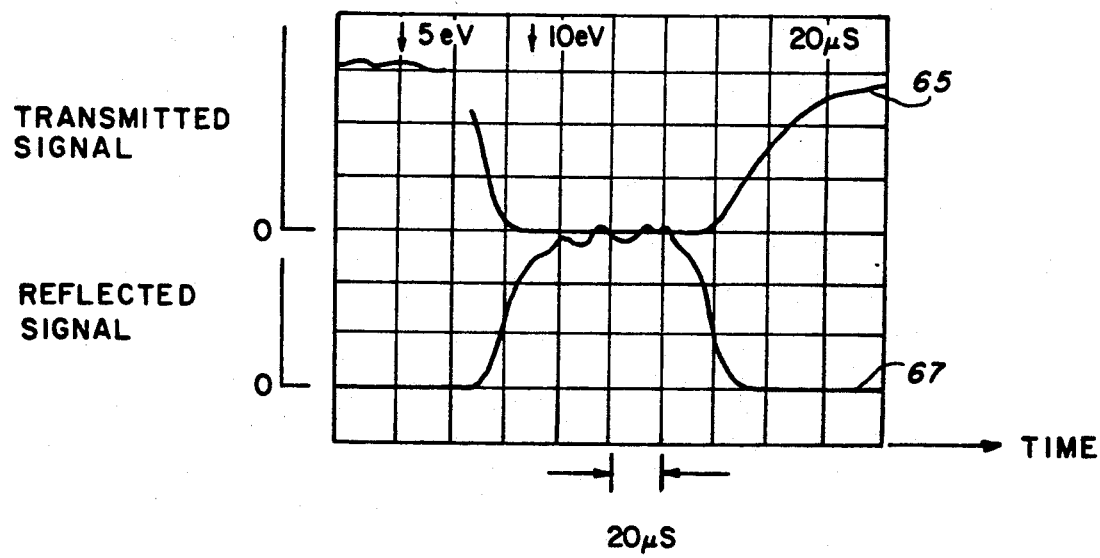
FIG. 5b shows amount of microwave signal transmitted through the plasma (upper track), and reflected by the plasma (lower track), before, during, and after the current pulse.

FIGS. 5a and 5b indicate that the times at which transmitted signal is low, and reflected signal high, correspond strongly with the duration of the triggering pulse shown in the figure. This indicates that the plasma mirror, once formed, is maintainable by maintaining the triggering current.

Figure 6A:
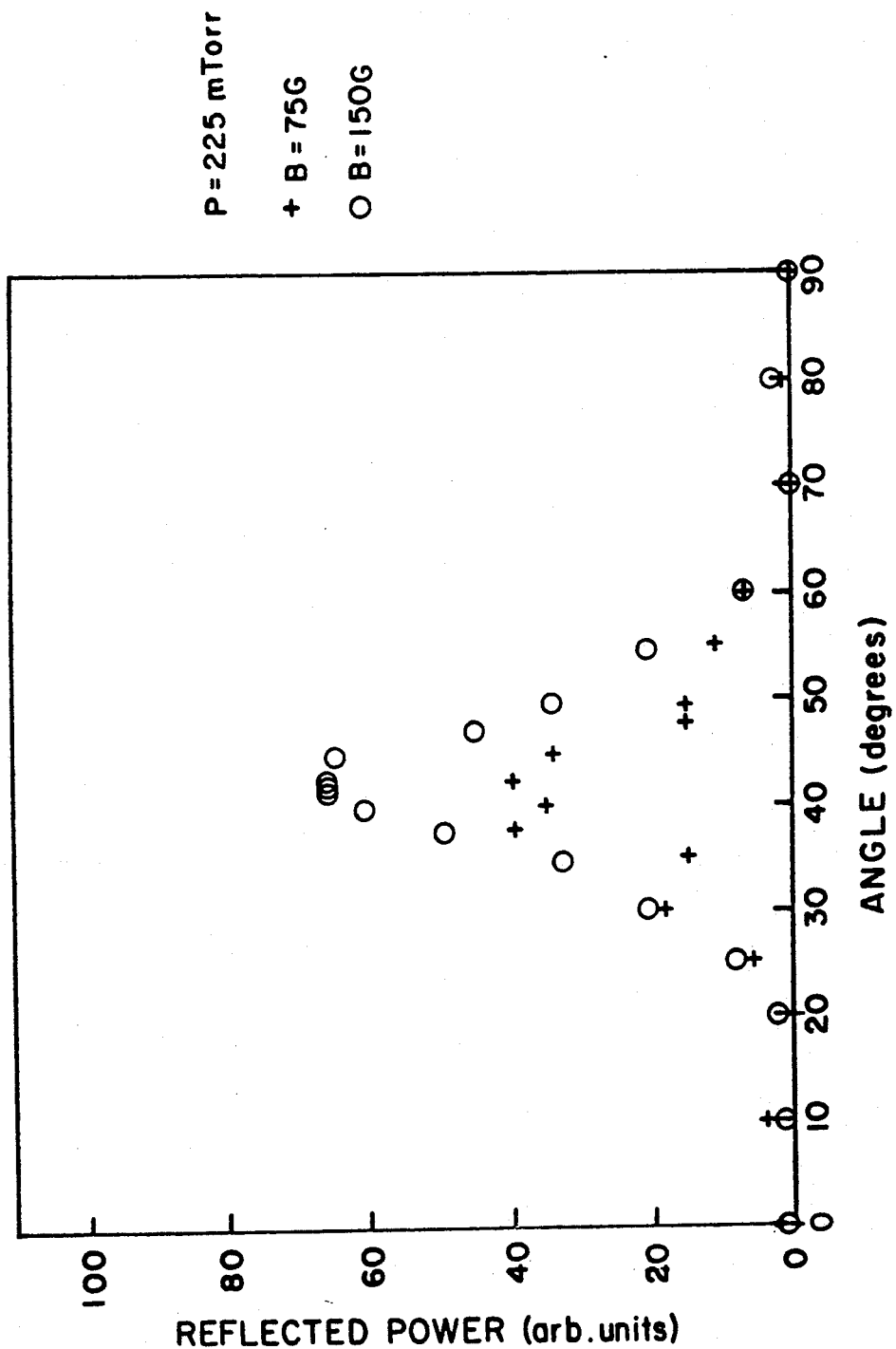
Figure 6B:
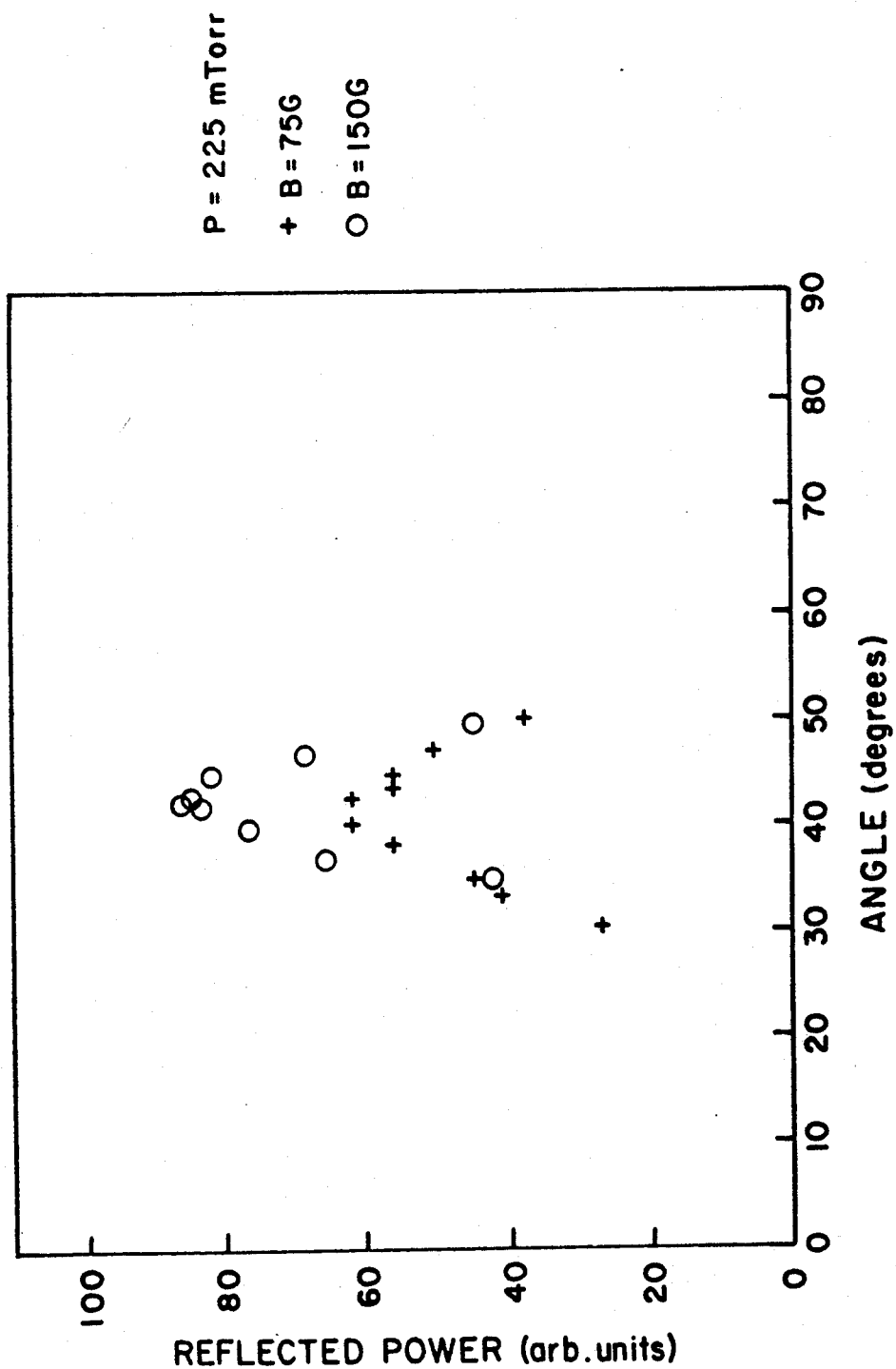
Figure 7:
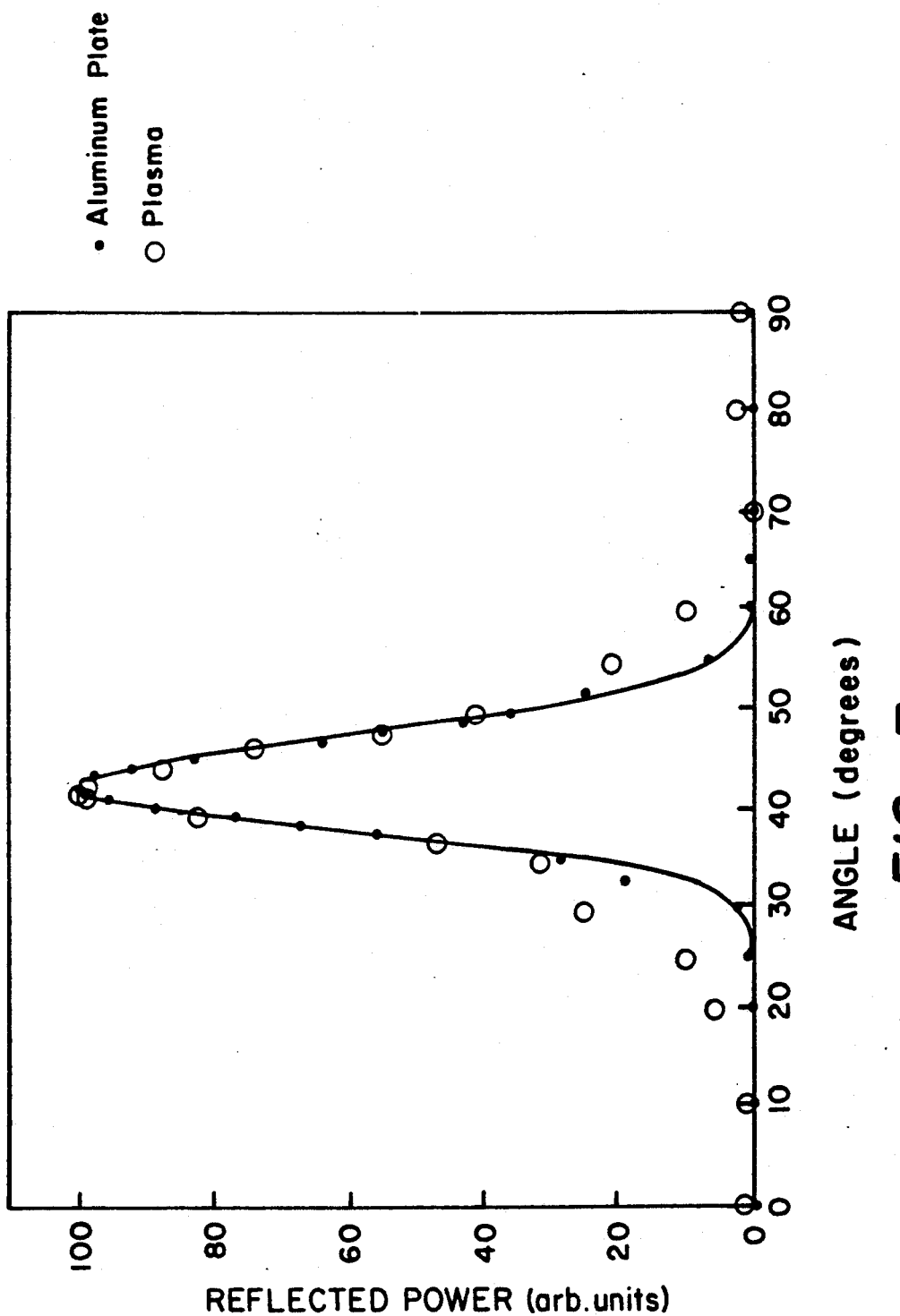

For given values of pressure and magnetic field, $V_1$ was increased to the maximum value consistent with arc-free operation and then, by rotating the cathode, a plot was obtained of reflected signal versus angle. For these proof-of-principle experiments the quality of reflection was judged by comparing the power reflected by the plasma sheet with the power reflected from an aluminum plate of identical dimensions that was hung from the cathode with the reflecting metal surface in the same location and orientation as the plasma. FIGS. 6a through 6c show reflected power versus angle for six different combinations of pressure and magnetic field. The ordinate is scaled in arbitrary units such that the power reflected by the aluminum plate at 45° is 100 units. It can be seen that at the lowest pressure, 145 mTorr, and the largest magnetic field, 150 G, the reflected power at 45° is equal to the power reflected by the aluminum plate. This comparison of the plasma reflector is shown by the data in FIG. 7, which is a plot of reflection as a function of angle for both the plasma and the metal sheet. Very close correspondence is obtained out to the 5 db point. For reasons that are not yet understood, the plasma reflection curve has more pronounced wings that of the metal plate. This is most likely due to geometric considerations with the finite sized plasma.

D. Conclusions From the Experiments

The usefulness of a plasma mirror for radar depends upon whether it can be used to rapidly redirect a radar beam. The rapidity with which the mirror can be established and extinguished is demonstrated in FIG. 5. The reflected signal rises to an approximately constant value in 20 μs and falls on the same timescale. The transmitted signal recovers on a longer timescale, about 40 μs, and approximately follows the decay of the current times could be shortened if the power supply had allowed the current to be brought up and back to zero in a few μs. In any application, the simple discharge circuit used in this experiment would likely be replaced by a modulated power supply allowing external control of the discharge pulse width and repetition frequency. The decay of the plasma density following the cessation of energy input will be determined principally by volume recombination with molecular oxygen and nitrogen ions. The characteristic time for the decay of the electron density is $t_d = 1/\alpha n_e$, where $\alpha$ is the recombination coefficient of gas 33 and the plasma electrons. For the conditions of our experiment, $\alpha$ is $5(10)^{-8} cm^3/sec$. See, e.g., F. J. Mehr and M. A. Biondi, "Electron Temperature Dependence of Recombination of $O_2^+$ and $N_2^+$ Ions with Electrons," Phys. Rev., Vol 181, p. 264 (1969). In this experiment we did not demonstrate repetitive formation of the mirror, but these preliminary results suggest that a repetition rate of 10 to 20 kHz should be possible, based on the 20 μs risetimes mentioned above. (E.g., a cycle having a rise and fall time of 20 μs each, and 10 μs therebetween during which the plasma is maintained, has an overall time period of 50 μs. This suggests that the plasma could be formed, collapsed, and reformed at a rate of about 20 kHz.)

Accordingly, this experiment demonstrates that a plane sheet of partially ionized plasma in a magnetic field can act as a microwave mirror. In terms of the power reflected into a fixed horn, the plasma mirror was virtually indistinguishable from a metal plate, although no measurements were made of the phase-quality of the reflected beam. The mirror could be established and could form the basis of an extremely agile radar direction system.

Since this experiment, we have tested plasma mirrors as radar detectors. Using a setup like that of FIG. 4, but replacing the receiving horn with a metal plate, and placing the receiving horn next to the transmitting horn, a 15 GHz signal was directed toward the metal plate and then reflected back through the mirror to the receiver. Rotation of the mirror, or movement or rotation of the metal plate, altered the return signal.

The invention has been described in what is considered to be the most practical and preferred embodiments. It is recognized, however, that obvious modifications to these embodiments may occur to those with skill in this art. Accordingly, the scope of the invention is to be discerned solely by reference to the appended claims, wherein:

We claim:

1. An apparatus for forming a planar sheet of plasma, said sheet being effective to reflect electromagnetic radiation, said apparatus comprising:
    a gas; and
    a cathode exposed to said gas;
    means for applying a magnetic confinement field to said gas;
    wherein said cathode extends along an elongate distance having a preselected curvature transverse to said field;
    said apparatus further comprising:
    means for triggering formation of a plasma in said gas;
    wherein said means for triggering, said cathode, and said means for applying are effective to produce said sheet of plasma with a cross-section having a curvature, in a plane transverse to said field, of substantially the same curvature as said preselected curvature.

2. The apparatus of claim 1, wherein said preselected curvature, and said cross-section, are both straight lines.

3. The apparatus of claim 1, wherein said apparatus further comprises a mounting means for mounting said cathode, said mounting means comprising an opening having substantially the same curvature as said preselected curvature, said cathode and said opening being substantially in registry with one another.

4. The apparatus of claim 1, wherein said cathode is mounted for rotation in said gas effective to permit said elongate distance to rotate about an axis transverse to said field.

5. The apparatus of claim 1, wherein said cathode, said field, and said means for triggering cooperate to permit repeatable forming of said planar sheet at different selected orientation about an axis transverse to said elongate distance.

6. The apparatus of claim 1, wherein:
said gas is at between about 100 to 400 mTorr, and said gas is selected from the group consisting essentially of: air, a molecular gas, and a noble gas plus an electron attacher.

7. The apparatus of claim 6, wherein said noble gas is argon, and said electron attacher is $SF_6$.

8. The apparatus of claim 7, wherein
said preselected curvature, and said cross-section, are both straight lines;
said apparatus further comprises a mounting means for mounting said cathode, said mounting means comprising an opening having substantially the same curvature as said preselected curvature, said cathode and said opening being substantially in registry with one another;
said cathode is mounted with said mounting means for rotation in said gas effective to permit said elongate distance to rotate about an axis transverse to said field; and
said cathode, said field, and said means for triggering cooperate to permit repeatable forming of said planar sheet at different selected orientations about an axis transverse to said elongate distance.

9. An method for forming a planar sheet of plasma, said sheet being effective to reflect electromagnetic radiation, said method comprising steps for:
providing a gas;
providing a cathode exposed to said gas, said cathode having an elongate distance of a preselected curvature;
applying a magnetic confinement field to said gas;
wherein said step for providing said cathode disposes said elongate distance of said cathode transverse to said field;
said method further comprising a step for triggering formation of a plasma in said gas;
wherein said steps for triggering, providing a cathode, and applying a magnetic confinement field, are effective to produce said sheet of plasma with a cross-section having a curvature, in a plane transverse to said field, of substantially the same curvature as said preselected curvature.

* * * * *